United States Patent
Ichikawa et al.

(10) Patent No.: US 10,928,818 B2
(45) Date of Patent: Feb. 23, 2021

(54) DRIVING ASSISTANCE DEVICE

(71) Applicant: TOYOTA JIDOSHA KABUSHIKI KAISHA, Aichi-ken (JP)

(72) Inventors: Kentaro Ichikawa, Shizuoka (JP); Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 15/862,781

(22) Filed: Jan. 5, 2018

(65) Prior Publication Data
US 2018/0143629 A1 May 24, 2018

Related U.S. Application Data

(63) Continuation of application No. 15/050,950, filed on Feb. 23, 2016, now Pat. No. 9,891,622, which is a continuation of application No. 13/704,251, filed as application No. PCT/JP2010/060218 on Jun. 16, 2010, now Pat. No. 9,304,513.

(51) Int. Cl.
| | |
|---|---|
| G05D 1/00 | (2006.01) |
| G05D 1/02 | (2020.01) |
| B60W 50/10 | (2012.01) |
| G01C 21/36 | (2006.01) |
| B60Q 1/46 | (2006.01) |
| G01C 21/34 | (2006.01) |

(52) U.S. Cl.
CPC .............. *G05D 1/0061* (2013.01); *B60Q 1/46* (2013.01); *B60W 50/10* (2013.01); *G01C 21/3415* (2013.01); *G01C 21/3617* (2013.01); *G05D 1/00* (2013.01); *G05D 1/021* (2013.01); *G05D 1/0214* (2013.01)

(58) Field of Classification Search
CPC ........ G05D 1/00; G05D 1/021; G05D 1/0214; G05D 1/0061; G01C 21/3415; G01C 21/3617; B60Q 1/46; B60W 50/10
See application file for complete search history.

(56) References Cited

U.S. PATENT DOCUMENTS

| | | |
|---|---|---|
| 3,727,714 A | 4/1973 | Ishikawa |
| 4,361,202 A | 11/1982 | Minovitch |
| 4,602,334 A | 7/1986 | Salesky |
| 4,807,101 A | 2/1989 | Milde, Jr. |
| 5,640,323 A | 6/1997 | Kleimenhagen et al. |
| 5,865,705 A * | 2/1999 | Shamoto et al. ... F16H 59/0204 477/79 |
| 6,169,940 B1 | 1/2001 | Jitsukata et al. |
| 6,356,820 B1 | 3/2002 | Hashimoto et al. |
| 6,813,557 B2 | 11/2004 | Schmidt et al. |

(Continued)

FOREIGN PATENT DOCUMENTS

| | | |
|---|---|---|
| DE | 103 54 910 A1 | 11/2004 |
| EP | 0 738 946 A1 | 10/1996 |

(Continued)

*Primary Examiner* — Dale W Hilgendorf
(74) *Attorney, Agent, or Firm* — Sughrue Mion, PLLC

(57) ABSTRACT

A driving assistance device, including an automated driving switch; an emergency button; and a controller configured to provide either automated driving in which travel is performed along a current travel path of a host vehicle or automated stopping in response to manipulation by a driver of the automated driving switch or of the emergency button.

8 Claims, 6 Drawing Sheets

(56) References Cited

U.S. PATENT DOCUMENTS

| | | |
|---|---|---|
| 6,902,021 B2 | 6/2005 | Kikuchi et al. |
| 7,447,573 B2 | 11/2008 | Hiwatashi et al. |
| 8,126,450 B2 | 2/2012 | Howarter et al. |
| 8,260,482 B1 * | 9/2012 | Szybalski et al. ... G05D 1/0061 701/23 |
| 8,290,703 B2 * | 10/2012 | Vavrus et al. ..... G01C 21/2617 701/434 |
| 8,532,862 B2 | 9/2013 | Neff |
| 9,008,887 B2 * | 4/2015 | Kindo et al. ......... G05D 1/0061 701/23 |
| 9,304,513 B2 * | 4/2016 | Ichikawa et al. .... G05D 1/0061 |
| 9,891,622 B2 * | 2/2018 | Ichikawa et al. .... G05D 1/0061 |
| 2004/0193363 A1 | 9/2004 | Schmidt et al. |
| 2004/0215377 A1 | 10/2004 | Yun |
| 2007/0198145 A1 * | 8/2007 | Norris et al. ........ G05D 1/0061 701/23 |
| 2008/0319596 A1 | 12/2008 | Yamada |
| 2009/0248231 A1 | 10/2009 | Kamiya |
| 2010/0063680 A1 | 3/2010 | Tolstedt et al. |
| 2010/0106356 A1 | 4/2010 | Trepagnier et al. |
| 2010/0286845 A1 | 11/2010 | Rekow et al. |
| 2012/0046817 A1 * | 2/2012 | Kindo et al. ......... G05D 1/0061 701/23 |
| 2013/0274986 A1 | 10/2013 | Trepagnier et al. |

FOREIGN PATENT DOCUMENTS

| | | |
|---|---|---|
| EP | 2 141 678 A1 | 1/2010 |
| JP | 2001-219760 A | 8/2001 |
| JP | 2001-260704 A | 9/2001 |
| JP | 2001-312799 A | 11/2001 |
| JP | 2002-236993 A | 8/2002 |
| JP | 2003-157493 A | 5/2003 |
| JP | 2005-319891 A | 11/2005 |
| JP | 2007-265377 A | 10/2007 |
| JP | 2009-026321 A | 2/2009 |
| WO | 2010024449 A1 | 3/2010 |

* cited by examiner

DRIVING ASSISTANCE DEVICE

CROSS-REFERENCE TO RELATED APPLICATIONS

This application is a Continuation of U.S. application Ser. No. 15/050,950, filed Feb. 23, 2016, which is a Continuation of U.S. application Ser. No. 13/704,251, filed Dec. 14, 2012, issued as U.S. Pat. No. 9,304,513, which is a National Phase Application of PCT/JP2010/060218, filed Jun. 16, 2010, the contents of which are incorporated herein by reference.

TECHNICAL FIELD

The present invention relates to a driving assistance device which assists a host vehicle in driving.

BACKGROUND ART

It is desirable to develop a driving assistance device which enables a driver to easily operate vehicle driving assistance and which is easy to manipulate for a case in which a vehicle travels and an emergency occurs, such as a case in which it is difficult to drive because a driver suddenly feels ill and the driver wants to stop the vehicle or a case in which it is temporarily difficult to drive because, for example, the driver sneezes and the driver wants to temporarily drive the vehicle along a road.

Here, as a device which performs host vehicle driving assistance, a travel assistance system has been known which can perform travel assistance control for constant speed travel, travel in a traffic jam, or the like, as disclosed in, for example, Japanese Unexamined Patent Application Publication No. 2001-260704. A travel assistance system includes an ACC (Active Cruise Control) microcomputer, a travel control microcomputer for traffic jams, a system operating switch, a SET switch, a CANCEL switch, and vehicle speed detection means.

In such a travel assistance system, the system operating switch, the SET switch, and the CANCEL switch are used for both the ACC microcomputer and the travel control microcomputer for traffic jams. For example, the system operating switch, the SET switch, and the CANCEL switch function as the control switches of the ACC microcomputer in a case in which vehicle speed is equal to or greater than 35 km/h and as the control switches of the travel control microcomputer for traffic jams in a case in which vehicle speed is equal to or less than 20 km/h, and travel assistance control can be realized based on the traveling state of a vehicle.

CITATION LIST

Patent Literature

[Patent Literature 1] Japanese Unexamined Patent Application Publication No. 2001-260704

SUMMARY OF INVENTION

Technical Problem

However, although, in the travel assistance system, travel assistance control based on the traveling state can be performed, there is room for improvement in order to appropriately perform travel assistance according to various types of states. For example, when it is temporarily difficult to drive because a driver sneezes while a vehicle according to the travel assistance system is traveling at vehicle speed which is equal to or greater than 35 km/h, it is conceivable that the SET switch is switched on because the ACC is useful for travel assistance.

Meanwhile, when it is difficult to drive because the driver suddenly feels ill in the above state, it is desirable to safely stop the vehicle instead of using ACC. In order to assist the stopping of the vehicle in the travel assistance system, it is conceivable that an automated driving assistance function for stopping be added to the travel assistance system in advance and automated driving is performed using the function. However, when an automated driving assistance function for stopping is added, travel assistance control is performed based on the traveling state (vehicle speed) in the travel assistance system. Therefore, in order to enable a plurality of types of travel assistance control to be operated and divided in the same vehicle speed range according to the state, it is necessary to provide a separate switching switch or the like. If so, since the driver needs to switch on the SET switch after switching the switching switch to desired travel assistance even in an emergency, thereby causing the driver to instinctively feel a sense of discomfort.

The present invention has been made in order to solve the above problems, and an object of the present invention is to provide a driving assistance device which it is easy to manipulate instinctively without causing a driver to feel a sense of discomfort.

Solution to Problem

That is, a driving assistance device according to an aspect of the present invention includes instruction means for instructing a change in a driving assistance operation state of a host vehicle; setting means for setting an operational purpose of the driving assistance; determination means for determining the driving assistance operation state based on the setting of the setting means when the instruction means is manipulated; and control means for performing vehicle travel control based on a determination result of the determination means.

According to an aspect of the present invention, when it is instructed to perform the driving assistance using the instruction means, the determination means determines the operation state of the driving assistance based on the operational purpose which is set using the setting means, and the control means performs the vehicle travel control based on the determination result. Therefore, since the driving assistance operation state is automatically determined based on the operational purpose and the driving assistance control is performed, the driving assistance device is easy to instinctively manipulate without causing the driver to feel a sense of discomfort.

In addition, in the driving assistance device according to an aspect of the present invention, it is preferable that the driving assistance device further include travel intention detection means for detecting travel continuation intention of a driver, and the determination means determine the driving assistance operation state based on a detection result of the travel intention detection means when the instruction means is manipulated. Therefore, since the driving assistance operation state is automatically determined based on the travel continuation intention of the driver and the driving assistance control is performed, the driving assistance device is easy to instinctively manipulate without causing the driver to feel a sense of discomfort.

In addition, in the driving assistance device according to an aspect of the present invention, it is preferable that the instruction means be means for instructing a change in the automated driving operation state of the host vehicle, the setting means be means for setting a destination, and the determination means determines the automated driving operation state based on whether or not the destination has been set when the instruction means is manipulated. Therefore, since the automated driving operation state is automatically determined based on whether or not the destination has been set and automated driving is performed, the driving assistance device is easy to instinctively manipulate without causing the driver to feel a sense of discomfort.

In addition, in the driving assistance device according to an aspect of the present invention, it is preferable that the determination means generate a route to the destination and starts automated driving when the destination has been set. Therefore, since the route to the destination is automatically generated according to the intention of the driver and automated driving starts when the destination has been set, the driving assistance device is easy to instinctively manipulate without causing the driver to feel a sense of discomfort.

In addition, in the driving assistance device according to an aspect of the present invention, it is preferable that the determination means generate a stopping route and starts automated driving when the destination has not been set. When the vehicle is being travelled and it is temporarily difficult to drive because the driver suddenly feels ill in the state in which the destination for automated driving has not been set, it is conceivable that the driver will not have composure to set the destination for automated driving. In an aspect of the present invention, when it is instructed to perform automated driving even though the destination has not been set, it is certified as an emergency, so that a stopping route is automatically generated and automated driving starts. Therefore, the driving assistance device is easy to instinctively manipulate without causing the driver to feel a sense of discomfort.

In addition, in the driving assistance device according to an aspect of the present invention, it is preferable that the determination means generate a route along a current travel path of the host vehicle and starts automated driving when the destination has not been set. When the vehicle travels and it is temporarily difficult to drive because, for example, the driver sneezes in the state in which the destination for automated driving has not been set, it is conceivable that the driver will not have composure to set the destination for automated driving. Therefore, when it is instructed to perform automated driving even though the destination has not been set, it is certified as a temporary emergency, so that a route along a current travel path is automatically generated and automated driving starts. Therefore, the driving assistance device is easy to instinctively manipulate without causing the driver to feel a sense of discomfort.

In addition, in the driving assistance device according to an aspect of the present invention, it is preferable that the instruction means be means for instructing a change in the automated driving operation state of the host vehicle, the setting means be means for setting the destination, and the determination means determines the automated driving operation state based on whether or not the destination has been set when the instruction means is manipulated, and determines the automated driving operation state based on a detection result of the travel intention detection means when the destination has not been set. Therefore, since the automated driving operation state is automatically determined according to the travel continuation intention of the driver and automated driving is performed, the driving assistance device is easy to instinctively manipulate without causing the driver to feel a sense of discomfort.

In addition, in the driving assistance device according to an aspect of the present invention, it is preferable that the determination means generate a route along a current travel path of the host vehicle and start automated driving when it is determined that there is travel continuation intention by the travel intention detection means. Therefore, when the driver has the travel continuation intention, the route along the current travel path is automatically generated and automated driving starts such that the host vehicle continuously travels. Therefore, the driving assistance device is easy to instinctively manipulate without causing the driver to feel a sense of discomfort.

In addition, in the driving assistance device according to an aspect of the present invention, it is preferable that the determination means generate a stopping route and start automated driving when it is determined that there is not travel continuation intention by the travel intention detection means. Therefore, when the driver does not have the travel continuation intention, the stopping route is automatically generated and exercise driving starts such that the host vehicle stops. Therefore, the driving assistance device is easy to instinctively manipulate without causing the driver to feel a sense of discomfort.

In addition, a driving assistance device according to an aspect of the present invention, includes: instruction means for instructing a change in a driving assistance operation state of a host vehicle; travel intention detection means for detecting travel continuation intention of a driver; determination means for determining the driving assistance operation state based on a detection result of the travel intention detection means when the instruction means is manipulated; and control means for performing vehicle travel control based on a determination result of the determination means.

According to an aspect of the present invention, since the driving assistance operation state is automatically determined based on the travel continuation intention of the driver and the driving assistance control is performed, the driving assistance device is easy to instinctively manipulate without causing the driver to feel a sense of discomfort.

Advantageous Effects of Invention

According to an aspect of the present invention, it is possible to provide a driving assistance device which it is easy to instinctively manipulate without causing a driver to feel a sense of discomfort. In addition, since an emergency stop button is not used to usual operating, it is difficult to manipulate the emergency stop button with instant judgment in an emergency. However, in a case of an aspect of the present invention, since an operation button which is used to being regularly manipulated is used, it is possible to immediately manipulate automated driving instruction means and start automated driving even in an emergency.

DESCRIPTION OF EMBODIMENTS

Figure 1:
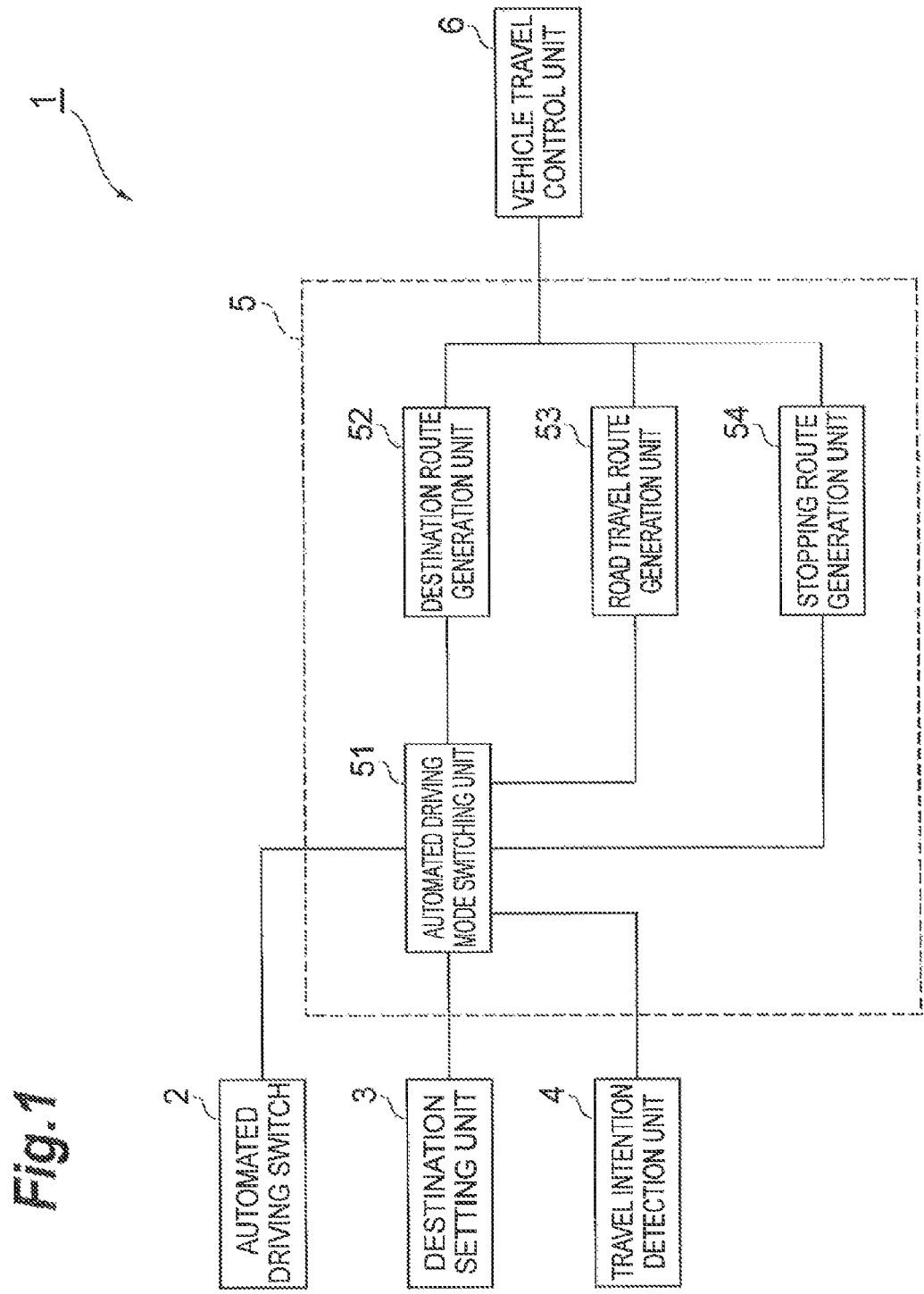
FIG. 1 is a block diagram illustrating a driving assistance device according to a first embodiment of the present invention.

Hereinafter, embodiments of the invention will be described in detail with reference to the accompanying drawings. Meanwhile, reference now should be made to the drawings, throughout which the same reference numerals are used to designate the same components, and duplicated description will be omitted.

FIG. 1 is a block diagram illustrating a driving assistance device according to a first embodiment of the present invention.

The driving assistance device 1 according to the embodiment is mounted on a host vehicle and used to perform automated driving of the host vehicle. The driving assistance device 1 includes an automated driving switch (instruction means) 2, a destination setting unit (setting means) 3, a travel intention detection unit (travel intention detection means) 4, an ECU (Electronic Control Unit, determination means) 5, and a vehicle travel control unit (control means) 6.

The automated driving switch 2 is used to instruct a change in the automated driving operation state (driving assistance operation state) of the host vehicle, and connected to the ECU 5. If the automated driving switch 2 is switched on, an automated driving start signal is transmitted to the ECU 5. Since it is assumed that the automated driving switch 2 is manipulated when a driver wants to start automated driving and there are many opportunities to be pushed on a regular basis, it is preferable that the automated driving switch 2 be provided at a location, for example, a steering median, the area around a shift lever, or the like, which is easy to be manipulated by the driver. In addition, although a touch panel-type switch or the like, in which an input screen is changed, may be used as the automated driving switch 2, it is preferable to use a mechanical switch or the like, the form of which is not changed in both a normal time and an emergency, in order to prevent the driver from being confused in an emergency.

The destination setting unit 3 is used to set the destination of automated driving by the driver, and is connected to the ECU 5. If the destination is input to the destination setting unit 3, the destination is transmitted to the ECU 5. As the destination setting unit 3, for example, the touch panel of a navigation system or the like can be used.

The travel intention detection unit 4 is used to detect the travel continuation intention of the driver, and is connected to the ECU 5. As the travel intention detection unit 4, an accelerator pedal sensor, a brake pedal sensor, or the like can be used.

For example, when the accelerator pedal sensor is used as the travel intention detection unit 4 and it is detected that an accelerator pedal is pressed on, it is determined that there is travel continuation intention. When it is not detected that the accelerator pedal is pressed on, it is determined that there is not the travel continuation intention.

In addition, when the brake pedal sensor is used as the travel intention detection unit 4 and it is detected that a brake pedal is pressed on, it is determined that there is not travel intention. When it is not detected that the brake pedal is pressed on, it is determined that there is travel intention. The travel intention detection unit 4 transmits a detection result to the ECU 5. In addition, the travel intention detection unit 4 may determine the travel intention based on the direction of the force added to a handle or a shift lever in addition to the accelerator pedal and the brake pedal. It may be determined that there is travel continuation intention when a direction in which a handle or a shift lever is pushed forward is detected, and it may be determined that there is not travel continuation intention when a direction in which a handle or a shift lever is pulled to the near side is detected. In addition, when hazard lamps or side turn signal lamps are blinking, it may be determined that there is not the travel intention. In addition, when a shift lever is in a D range, it can be determined that there is the travel intention. In addition, in a case of a vehicle which has a cruise control function, it may be determined that there is the travel continuation intention when the automatic accelerator function is in an ON state, and it may be determined that there is not the travel continuation intention in an OFF state. In addition, the determination can be performed based on the manipulating action of the driver. In addition, whether there is the travel intention or not may be determined by a combination of the above-described determination means.

The ECU 5 is used to control the whole driving assistance device 1. If the automated driving switch 2 is manipulated and an automated driving start signal is received from the automated driving switch 2, the ECU 5 determines the automated driving operation state based on the destination received from the destination setting unit 3 and the detection result received from the travel intention detection unit 4. The ECU 5 can be configured with, for example, a computer which includes a CPU, a ROM, and a RAM as a main constituent. The ECU 5 includes an automated driving mode switching unit 51, a destination route generation unit 52, a road travel route generation unit 53, and a stopping route generation unit 54.

The automated driving mode switching unit 51 is connected to the automated driving switch 2, the destination setting unit 3 and the travel intention detection unit 4. If the automated driving switch 2 is manipulated and the automated driving start signal is received from the automated driving switch 2, the automated driving mode switching unit 51 switches an automated driving mode which starts from now based on the destination received from the destination setting unit 3 and the detection result received from the travel intention detection unit 4.

The automated driving mode can be switched to three kinds of modes, that is, automated driving in which travel is performed to the destination set using the destination setting unit 3 (hereinafter, referred to as automated driving to the destination), automated driving in which travel is performed along the current travel path of the host vehicle (hereinafter, referred to as automated driving along the road), and automated stopping. The automated driving mode switching unit 51 is connected to the destination route generation unit 52, the road travel route generation unit 53, and the stopping route generation unit 54. If the automated driving mode is switched to the automated driving to the destination, the automated driving mode switching unit 51 outputs a destination to the destination route generation unit 52. If the automated driving mode is switched to the automated driving along the road, the automated driving mode switching unit 51 outputs a route generation instruction to the road travel route generation unit 53. If the automated driving mode is switched to the automated stopping, the automated driving mode switching unit 51 outputs a route generation instruction to the stopping route generation unit 54.

If the destination is received from the automated driving mode switching unit 51, the destination route generation unit 52 generates a route from a current location to the received destination. The destination route generation unit 52 is connected to the vehicle travel control unit 6 which is located on the outside of the ECU 5, and transmits the generated route to the vehicle travel control unit 6.

If the route generation instruction is received from the automated driving mode switching unit 51, the road travel route generation unit 53 generates a route in order to perform the automated driving along the road. The road travel route generation unit 53 is connected to the vehicle travel control unit 6, and transmits the generated route to the vehicle travel control unit 6. In addition, as a process of the road travel route generation unit 53, it is possible to generate a route for travel along the road on which travel is being performed. If there are a plurality of travel lanes on the road on which travel is being performed, a straight lane may be selected. In addition, if there are a plurality of straight lanes, a passing lane should be avoided as much as possible, that is, a side lane may be preferentially selected. Further, an uncrowded lane may be preferentially selected or a lane may be selected according to the direction of a traffic indicator manipulated by the driver. When it is impossible to go straight on the road on which travel is being performed, such as a T-shaped intersection, or when there are a plurality of candidates along the road, such as a divergence road, the direction of a small intersection angle with respect to the road on which travel is being performed or the direction of a small steering angle may be selected, the road with a big width may be selected, or the direction of the traffic indicator manipulated by the driver may be followed. In addition, a method of generating a route which enables vehicle travel to be safely continued according to traffic rules may be used.

If the route generation instruction is received from the automated driving mode switching unit 51, the stopping route generation unit 54 generates a route in order to perform automated stopping. The stopping route generation unit 54 is connected to the vehicle travel control unit 6, and transmits the generated route to the vehicle travel control unit 6. In addition, as a process of the stopping route generation unit 54, it is possible to generate a route in which stopping is performed in such a way as to approach to the side of the road on which travel is being performed. In addition, it is possible to generate a route in which stopping is performed in such a way as to search the outside of the road for a place where stopping can be performed without obstructing the passage of another vehicle. In addition, if the road on which travel is being performed is prohibited from being parked and stopped, stopping may be performed in such a way as to change the route to another road in which stopping can be performed. If there is a possibility that a stopping location may obstruct the travel of another vehicle, attention may be called by blinking the hazard lamps. If there is danger of immediate slowdown when stopping is performed, attention may be called to vehicles in the rear by blinking the hazard lamps. In addition, there may be another route generation method which enables a vehicle to safely perform stopping along traffic roots.

The automated driving mode switching unit 51, the destination route generation unit 52, the road travel route generation unit 53, and the stopping route generation unit 54, which are provided to the ECU 5, may be configured in such a way as to install a computer program and may be configured with respective hardware.

The vehicle travel control unit 6 is used to control the travel of the host vehicle based on the route (determination result) transmitted from the ECU 5, and, for example, an engine ECU, a braking ECU, a steering ECU, or the like corresponds to the vehicle travel control unit 6.

Next, the operation of the driving assistance device 1 according to the embodiment will be described.

Figure 2:
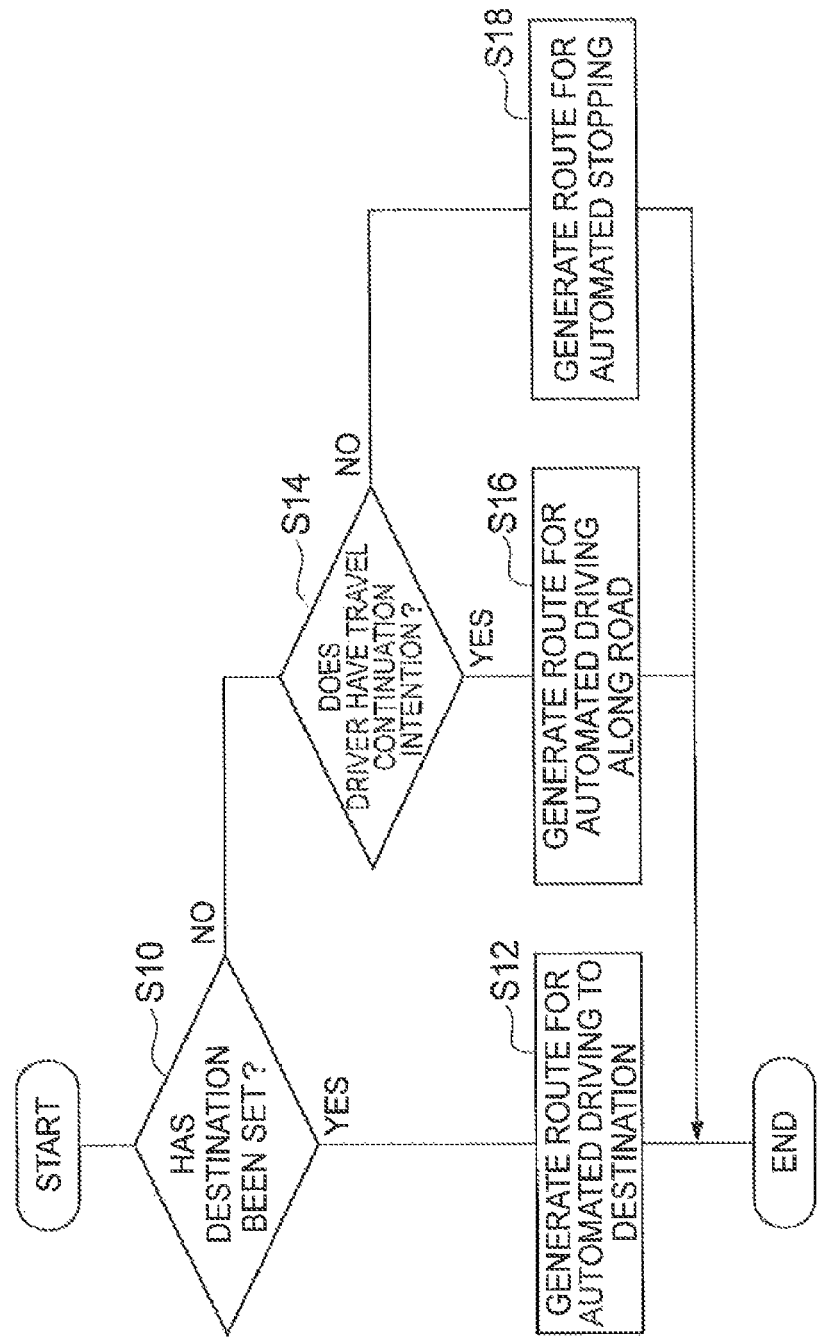
FIG. 2 is a flowchart illustrating the operation of the ECU of the driving assistance device shown in FIG. 1.

FIG. 2 is a flowchart illustrating the operation of the ECU of the driving assistance device shown in FIG. 1.

If the automated driving mode switching unit 51 receives the automated driving start signal from the automated driving switch 2, the ECU 5 starts the operation. As the operation of the ECU 5, it is first determined whether or not an automated driving destination has been set using the destination setting unit 3 in step S10 as shown in FIG. 2. If the destination is received from the destination setting unit 3, the automated driving mode switching unit 51 determines that the destination has been set. If the destination is not received from the destination setting unit 3, the automated driving mode switching unit 51 determines that a destination has not been set.

If it is determined that the destination has been set in step S10, the automated driving mode switching unit 51 outputs the destination to the destination route generation unit 52, and the destination route generation unit 52 which receives the destination generates a route for automated driving to the destination and further transmits the generated route to the vehicle travel control unit 6 in step S12. Thereafter, the operation of the ECU 5 is terminated.

Meanwhile, in step S10, if it is determined that a destination has not been set, the automated driving mode switching unit 51 determines whether the driver has the travel continuation intention or not based on the detection result received from the travel intention detection unit 4 in step S14.

If it is determined that the driver has the travel continuation intention by the automated driving mode switching unit 51 in step S14, the automated driving mode switching unit 51 outputs the route generation instruction to the road travel route generation unit 53, and the road travel route generation unit 53 which receives the route generation instruction generates a route for automated driving along the road and further transmits the generated route to the vehicle control unit 6 in step S16. Thereafter, the operation of the ECU 5 is terminated.

Meanwhile, if it is determined that the driver does not have the travel continuation intention by the automated driving mode switching unit 51 in step S14, the automated driving mode switching unit 51 outputs the route generation instruction to the stopping route generation unit 54 and the stopping route generation unit 54 received the route generation instruction generates a route for automated stopping and further transmits the generated route to the vehicle control unit 6 in step S18. Thereafter, the operation of the ECU 5 is terminated.

As described above, according to the driving assistance device 1 according to the embodiment, if the execution of automated driving is instructed using the automated driving switch 2 and a destination has been set using the destination setting unit 3, the route for the automated driving to the destination is automatically generated by the ECU 5 and the automated driving to the destination starts. Meanwhile, if a destination has not been set using the destination setting unit 3 and it is detected that the driver has the travel continuation intention using the travel intention detection unit 4, the route for the automated driving along the road is automatically generated using the ECU 5 and the automated driving along the road starts. Further, if a destination has not been set using the destination setting unit 3 and it is detected that the driver does not have the travel continuation intention using the travel intention detection unit 4, the route for the automated stopping is automatically generated using the ECU 5 and the automated stopping starts. Therefore, only when the driver presses the automated driving switch 2 which has regularly many opportunities to be pressed and which the driver is used to pressing, the automated driving operation state is automatically determined based on the intention of the driver and the driving assistance control is performed. Therefore, the driving assistance device is easy to instinctively manipulate without causing the driver to feel a sense of discomfort.

In addition, according to the related art, in order to perform the automated driving to the destination, the automated driving along the road and the automated stopping, it is necessary to provide respective relevant switches or a switching switch. However, according to the driving assistance device 1 according to the embodiment, it is sufficient if only the automated driving switch 2 is provided as a switch for execution, thus it is possible to attempt to reduce production costs or to improve the design freedom.

Next, a driving assistance device according to a second embodiment of the present invention will be described.

Figure 3:
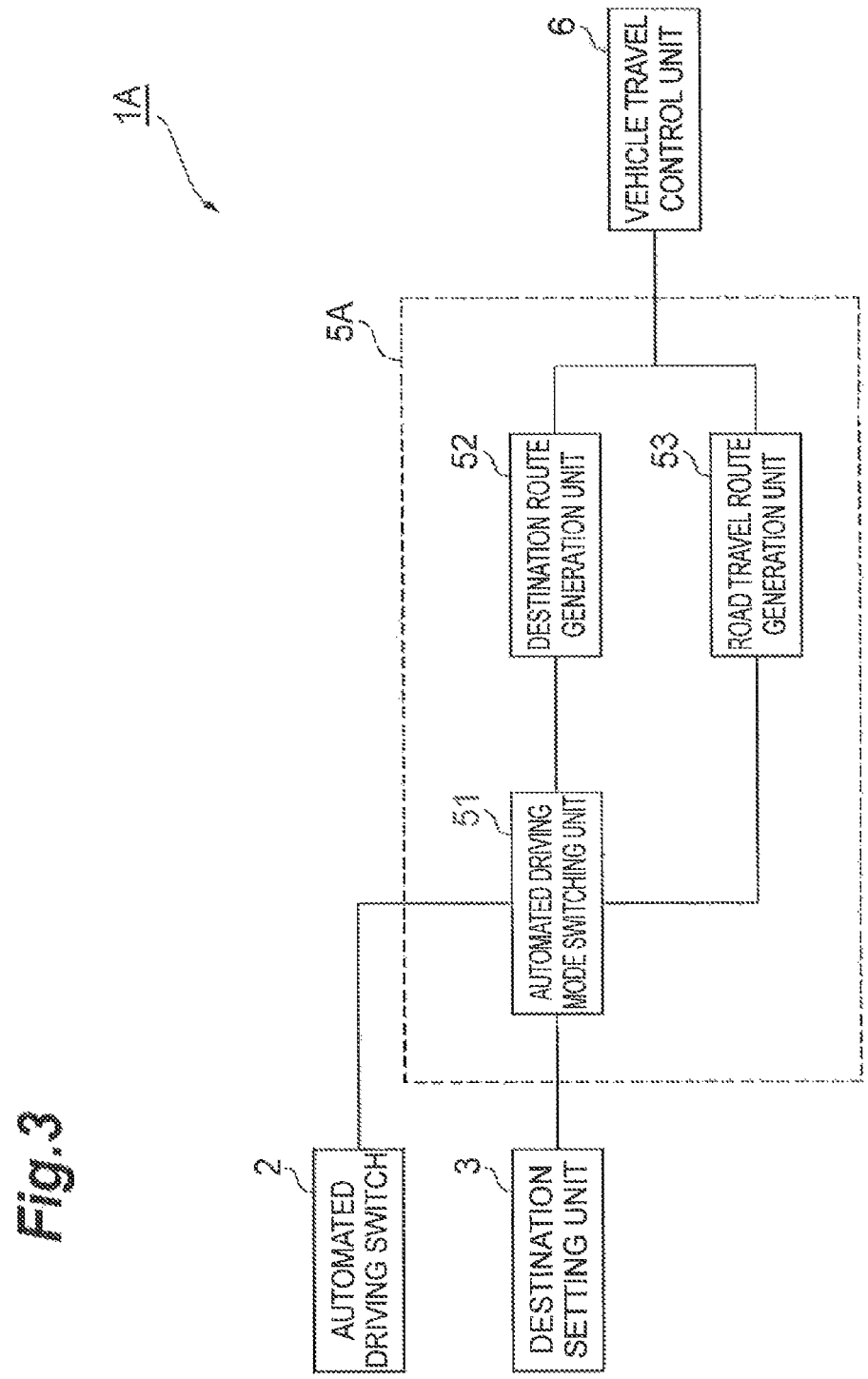
FIG. 3 is a block diagram illustrating a driving assistance device according to a second embodiment of the present invention.

FIG. 3 is a block diagram illustrating the driving assistance device according to the second embodiment of the present invention.

A driving assistance device 1A according to the second embodiment is different from the driving assistance device 1 according to the first embodiment in that the travel intention detection unit 4 is not provided and further an ECU 5A, which does not include the stopping route generation unit 54, is provided instead of the ECU 5.

Next, the operation of the driving assistance device 1A according to the embodiment will be described.

Figure 4:
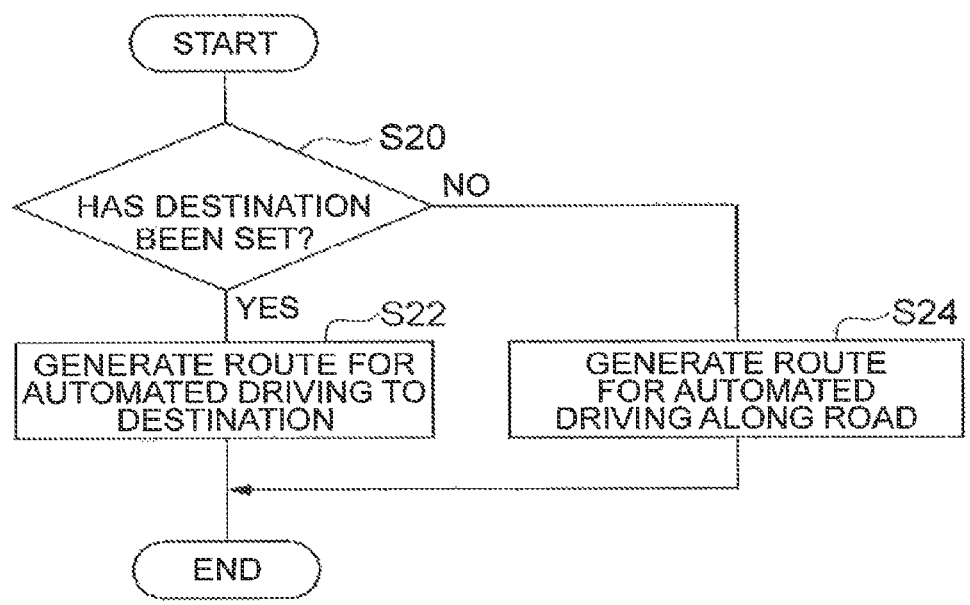
FIG. 4 is a flowchart illustrating the operation of the ECU of the driving assistance device shown in FIG. 3.

FIG. 4 is a flowchart illustrating the operation of the ECU of the driving assistance device shown in FIG. 3.

If the automated driving mode switching unit 51 receives the automated driving start signal from the automated driving switch 2, the ECU 5A starts the operation. As the operation of the ECU 5A, it is first determined whether or not an automated driving destination has been set using the destination setting unit 3 in step S20 as shown in FIG. 4. If the destination is received from the destination setting unit 3, the automated driving mode switching unit 51 determines that the destination has been set. If the destination is not received from the destination setting unit 3, the automated driving mode switching unit 51 determines that a destination has not been set.

If it is determined that the destination has been set in step S20, the automated driving mode switching unit 51 outputs the destination to the destination route generation unit 52, and the destination route generation unit 52 which receives the destination generates a route for the automated driving to the destination and further transmits the generated route to the vehicle travel control unit 6 in step S22. Thereafter, the operation of the ECU 5A is terminated.

Meanwhile, if it is determined that a destination has not been set in step S20, the automated driving mode switching unit 51 outputs the route generation instruction to the road travel route generation unit 53, and the road travel route generation unit 53 which receives the route generation instruction generates a route for the automated driving along the road and further transmits the generated route to the vehicle travel control unit 6 in step S24. Thereafter, the operation of the ECU 5A is terminated.

As described above, according to the driving assistance device 1A according to the embodiment, if the execution of the automated driving is instructed using the automated driving switch 2 and a destination has been set using the destination setting unit 3, the route for the automated driving to the destination is automatically generated using the ECU 5A and the automated driving to the destination starts. If a destination has not been set using the destination setting unit 3, the route for the automated driving along the road is automatically generated using the ECU 5A and the automated driving along the road starts. Therefore, only when the driver presses the automated driving switch 2 which has regularly many opportunities to be pressed and which the driver is used to pressing, the automated driving operation state is automatically determined based on the operational purpose and the driving assistance control is performed. Therefore, the driving assistance device is easy to instinctively manipulate without causing the driver to feel a sense of discomfort.

In addition, according to the related art, in order to perform the automated driving to the destination and the automated driving along the road, it is necessary to provide respective relevant switches or a switching switch. However, according to the driving assistance device 1A according to the embodiment, it is sufficient if only the automated driving switch 2 is provided as a switch for execution, thus it is possible to attempt to reduce production costs or to improve the design freedom.

Next, a driving assistance device according to a third embodiment of the present invention will be described.

Figure 5:
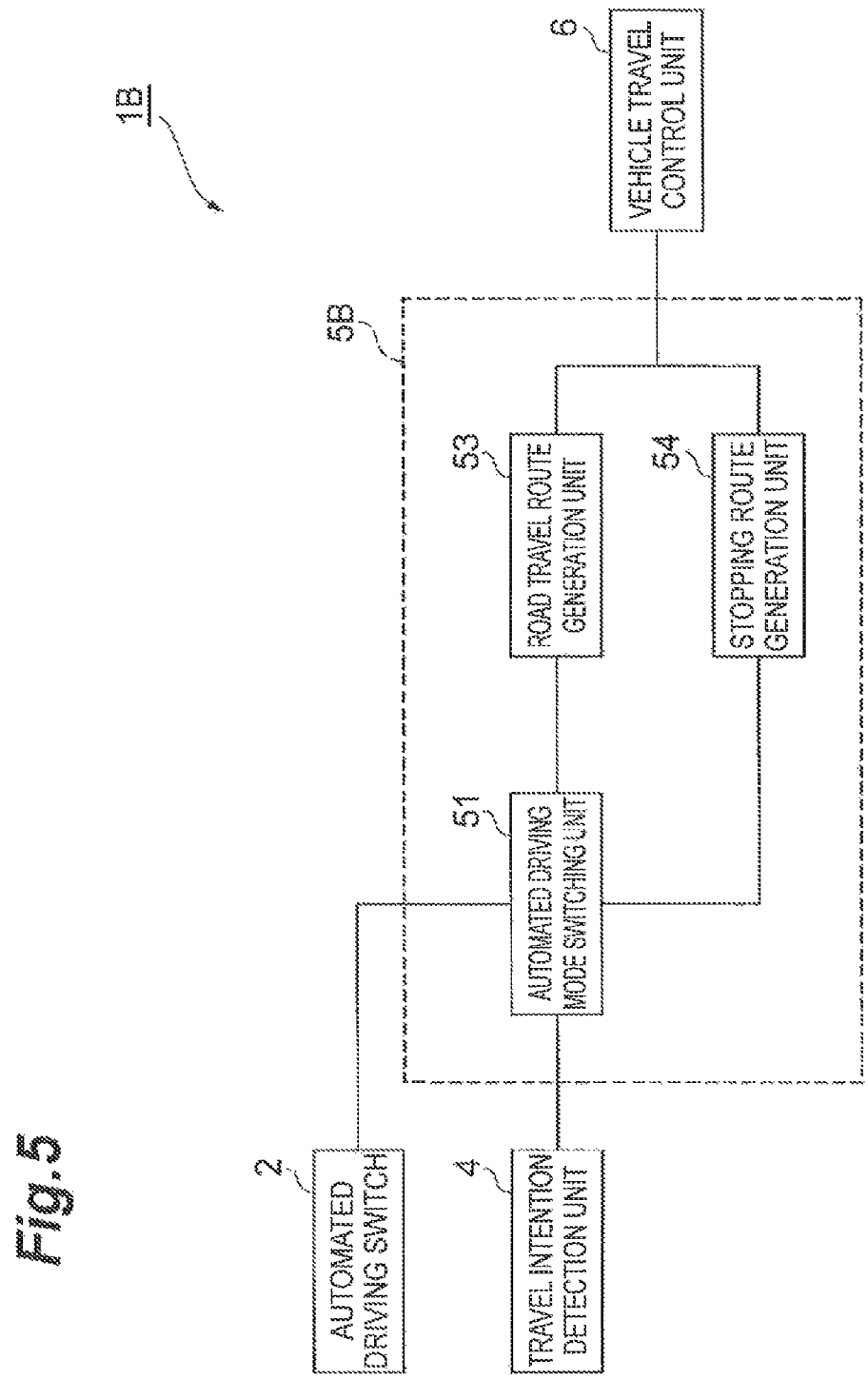
FIG. 5 is a block diagram illustrating a driving assistance device according to a third embodiment of the present invention.

FIG. 5 is a block diagram illustrating the driving assistance device according to the third embodiment of the present invention.

The driving assistance device 1B according to the embodiment is mounted on the host vehicle, and is used to perform automated driving of the host vehicle. The driving assistance device 1B includes an automated driving switch (instruction means) 2, a travel intention detection unit (travel intention detection means) 4, an ECU (determination means) 5B, and the vehicle travel control unit (control means) 6.

The automated driving switch 2 is used to instruct a change in the automated driving operation state of the host vehicle, and is connected to the ECU 5B. If the automated driving switch 2 is switched on, an automated driving start signal is transmitted to the ECU 5B. Since it is assumed that the automated driving switch 2 is manipulated when a driver wants to start automated driving and there are many opportunities to be pushed on a regular basis, it is preferable that the automated driving switch 2 be provided at a location, for example, a steering median, the area around a shift lever, or the like, which is easy to be manipulated by the driver. In addition, although a touch panel-type switch or the like, in which an input screen is changed, may be used as the automated driving switch 2, it is preferable to use a mechanical switch or the like, the form of which is not changed in both a normal time and an emergency, in order to prevent the driver from being confused in an emergency.

The travel intention detection unit 4 is used to detect the travel continuation intention of the driver, and is connected to the ECU 5B. As the travel intention detection unit 4, an accelerator pedal sensor, a brake pedal sensor, or the like can be used.

For example, when the accelerator pedal sensor is used as the travel intention detection unit 4 and it is detected that an accelerator pedal is pressed on, it is determined that there is the travel continuation intention. When it is not detected that the accelerator pedal is pressed on, it is determined that there is not the travel continuation intention.

In addition, when the brake pedal sensor is used as the travel intention detection unit 4 and it is detected that a brake pedal is pressed on, it is determined that there is not travel intention. When it is not detected that the brake pedal is pressed on, it is determined that there is the travel intention. The travel intention detection unit 4 transmits a detection result to the ECU 5B.

The ECU 5B is used to control the whole driving assistance device 1B. If the automated driving switch 2 is manipulated and an automated driving start signal is received from the automated driving switch 2, the ECU 5B determines the automated driving operation state based on the detection result received from the travel intention detection unit 4. The ECU 5B can be configured with, for example, a computer which includes a CPU, a ROM, and a RAM as a main constituent. The ECU 5B includes an automated driving mode switching unit 51, a road travel route generation unit 53, and a stopping route generation unit 54.

The automated driving mode switching unit 51 is connected to the automated driving switch 2 and the travel intention detection unit 4. If the automated driving switch 2 is manipulated and the automated driving start signal is received from the automated driving switch 2, the automated driving mode switching unit 51 switches an automated driving mode which starts from now based on the detection result received from the travel intention detection unit 4.

The automated driving mode can be switched to two kinds of modes, that is, automated driving along the road and automated stopping. The automated driving mode switching unit 51 is connected to the road travel route generation unit 53 and the stopping route generation unit 54. If the automated driving mode is switched to the automated driving along the road, the automated driving mode switching unit 51 outputs a route generation instruction to the road travel route generation unit 53. If the automated driving mode is switched to the automated stopping, the automated driving mode switching unit 51 outputs a route generation instruction to the stopping route generation unit 54.

If the route generation instruction is received from the automated driving mode switching unit 51, the road travel route generation unit 53 generates a route in order to perform the automated driving along the road. The road travel route generation unit 53 is connected to the vehicle travel control unit 6 which is in the outside of the ECU 5B, and transmits the generated route to the vehicle travel control unit 6. In addition, as a process of the road travel route generation unit 53, it is possible to generate a route for travel along the road on which travel is being performed. If there are a plurality of travel lanes on the road on which travel is being performed, a straight lane may be selected. In addition, if there are a plurality of straight through lanes, a passing lane should be avoided as much as possible, that is, a side lane may be preferentially selected. Further, an uncrowded lane may be preferentially selected or a lane may be selected according to the direction of a traffic indicator manipulated by the driver. When it is impossible to go straight on the road on which travel is being performed, such as a T-shaped intersection, or when there are a plurality of candidates along the road, such as a divergence road, the direction of a small intersection angle with respect to the road on which travel is being performed or the direction of a small steering angle may be selected, the road with a big width may be selected, or the direction of the traffic indicator manipulated by the driver may be followed. In addition, a method of generating a route which enables vehicle travel to be safely continued according to traffic rules may be used.

If the route generation instruction is received from the automated driving mode switching unit 51, the stopping route generation unit 54 generates a route in order to perform automated stopping. The stopping route generation unit 54 is connected to the vehicle travel control unit 6, and transmits the generated route to the vehicle travel control unit 6. In addition, as a process of the stopping route generation unit 54, it is possible to generate a route in which stopping is performed in such a way as to approach to the side of the road on which travel is being performed. In addition, it is possible to generate a route in which stopping is performed in such a way as to search the outside of the road for a place where stopping can be performed without obstructing the passage of another vehicle. In addition, if the road on which travel is being performed is prohibited from being parked and stopped, stopping may be performed in such a way as to change the route to another road in which stopping can be performed. If there is a possibility that a stopping location may obstruct the travel of another vehicle, attention may be called by blinking the hazard lamps. If there is danger of immediate slowdown when stopping is performed, attention may be called to vehicles in the rear by blinking the hazard lamps. In addition, there may be another route generation method which enables a vehicle to safely perform stopping.

The automated driving mode switching unit 51, the road travel route generation unit 53, and the stopping route generation unit 54, which are provided to the ECU 5B, may be configured in such a way as to install a computer program and may be configured with respective hardware.

The vehicle travel control unit 6 is used to control the travel of the host vehicle based on the route transmitted from the ECU 5B, and, for example, an engine ECU, a braking ECU, a steering ECU, or the like corresponds to the vehicle travel control unit 6.

Next, the operation of the driving assistance device 1B according to the embodiment will be described.

Figure 6:
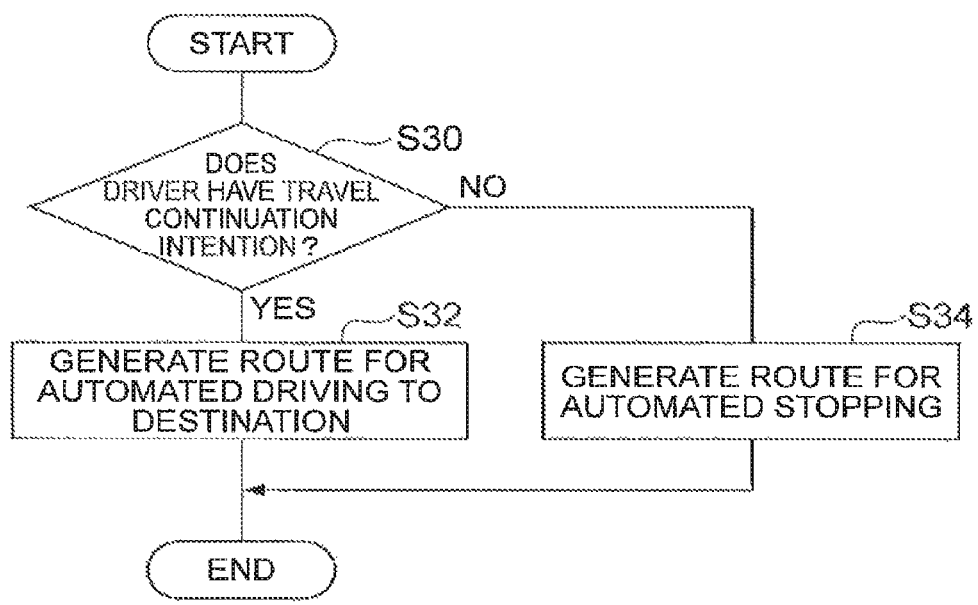
FIG. 6 is a flowchart illustrating the operation of the ECU of the driving assistance device shown in FIG. 5.

FIG. 6 is a flowchart illustrating the operation of the ECU of the driving assistance device shown in FIG. 5.

If the automated driving mode switching unit 51 receives the automated driving start signal from the automated driving switch 2, the ECU 5B starts the operation. As the operation of the ECU 5B, it is first determined whether or not the driver has the travel continuation intention based on the detection result received from the travel intention detection unit 4 in step in step S30 as shown in FIG. 6.

In step S30, if it is determined that the driver has the travel continuation intention using the automated driving mode switching unit 51, the automated driving mode switching unit 51 outputs the route generation instruction to the road travel route generation unit 53, and the road travel route generation unit 53 which receives the route generation instruction generates a route for the automated driving along the road and further transmits the generated route to the vehicle control unit 6 in step S32. Thereafter, the operation of the ECU 5B is terminated.

Meanwhile, if it is determined that the driver does not have the travel continuation intention using the automated driving mode switching unit 51 in step S30, the automated driving mode switching unit 51 outputs the route generation instruction to the stopping route generation unit 54 and the stopping route generation unit 54 which receives the route generation instruction generates a route for automated stopping and further transmits the generated route to the vehicle control unit 6 in step S34. Thereafter, the operation of the ECU 5B is terminated.

As described above, according to the driving assistance device 1B according to the embodiment, if the execution of automated driving is instructed using the automated driving switch 2 and it is detected that the driver has the travel continuation intention using the travel intention detection unit 4, the route for the automated driving along the road is automatically generated using the ECU 5B and the automated driving along the road starts. If it is detected that the driver does not have the travel continuation intention using the travel intention detection unit 4, the route for the automated stopping is automatically generated using the ECU 5B and the automated stopping starts. Therefore, only when the driver presses the automated driving switch 2 which has regularly many opportunities to be pressed and which the driver is used to pressing, the automated driving operation state is automatically determined based on the intention of the driver and the driving assistance control is performed. Therefore, the driving assistance device is easy to instinctively manipulate without causing the driver to feel a sense of discomfort.

In addition, according to the related art, in order to perform the automated driving along the road and the automated stopping, it is necessary to provide respective relevant switches or a switching switch. However, according to the driving assistance device 1B according to the embodiment, it is sufficient if only the automated driving switch 2 is provided as a switch for execution, thus it is possible to attempt to reduce production costs or to improve the design freedom.

Meanwhile, the present invention is not limited to the above-described embodiments. For example, in the driving assistance devices 1 and 1B according to the embodiments, the ECU 5 generates the route for the automated driving along the road or the route for the automated stopping based on whether or not the driver has the travel continuation intention. However, in addition to this, the strength of the travel continuation intention may be detected at a plurality of levels by the travel intention detection unit 4 and an automated driving route based on each level may be generated. In addition, a limited value on an addition side or a subtraction side may be determined depending on the level. In this case, sudden acceleration or sudden deceleration can be used when the intention is strong, and gradual acceleration can be used when the intention is weak. In addition, the limited value of the speed may be determined based on the level. In this case, the limited value may be used up to the speed limit on the road when there is the travel intention and the intention is strong, and a little more room may be allowed for the speed limit when there is the travel intention and the intention is weak. In addition, a stopping place may be determined based on the level. In this case, stopping is performed at the nearest location while approaching the side, as much as possible when there is not the travel intention and the intention is strong, stopping may be performed by searching the outside of a road for a location where the vehicle is taken out when there is not the travel intention and the intention is weak. In addition, a method of generating a route in which efficiency has priority based on the level, such as rapid proceeding or rapid stopping, may be used. As a method of detecting the strength of the travel continuation intention, when an accelerator pedal sensor is used as the travel intention detection unit 4, it is possible to determine the strength of the existence of the travel continuation intention, at a plurality of levels based on the pushing amount of the accelerator pedal detected by the accelerator pedal sensor. In addition, when a brake pedal sensor is used as the travel intention detection unit 4, it is possible to determine the strength of the non-existence of the travel continuation intention, at a plurality of levels based on the pushing amount of the brake pedal detected by the brake pedal sensor. In addition, when both the accelerator pedal sensor and the brake pedal sensor are used as the travel intention detection unit 4 and it is detected that the accelerator pedal is pressed, it can be determined that the travel continuation intention is strong. When it is not detected that any of the accelerator pedal and the brake pedal is pressed, it can be determined that the travel continuation intention is weak. When it is detected that the brake pedal is pressed, it can be determined that there is not the travel continuation intention.

In addition, in the driving assistance devices 1, 1A, and 1B according to the embodiments, it is configured that automated driving starts in such a way that the automated driving switch 2 is pushed. However, in addition to this, it may be configured that an emergency button is further provided and the automated driving along the road or the automated stopping starts when any of the automated driving switch 2 or the emergency button is pushed.

INDUSTRIAL APPLICABILITY

According to the present invention, it is possible to provide a driving assistance device which is easy to instinctively manipulate without causing the driver to feel a sense of discomfort.

REFERENCE SIGNS LIST

1, 1A, 1B . . . driving assistance device, 2 . . . automated driving switch (instruction means), 3 . . . destination setting unit (setting means), 4 . . . travel intention detection unit (travel intention detection means), 5, 5A, 5B . . . ECU (determination means), 6 . . . vehicle travel control unit (control means).

The invention claimed is:

1. A driving assistance device, comprising:
   an input switch configured to be used to input an instruction of an automated driving of a vehicle;
   a controller configured:
   to determine whether or not a destination of the automated driving has been set,
   to generate a route of the vehicle to the automated driving destination and to control the vehicle to travel along the route to the automated driving destination if the instruction for the vehicle to be in the automated driving operation state has been input by the input switch and the automated driving destination has been set, and
   to generate a route of the vehicle along a current travel path of the vehicle and to control the vehicle to travel along the current travel path of the vehicle if the instruction for the vehicle to be in the automated driving operation state has been input by the input switch and the automated driving destination has not been set.

2. The driving assistance device according to claim 1, comprising an emergency button,
   wherein the controller is configured to generate the route of the vehicle to the automated driving destination and to control the vehicle to travel along the route to the automated driving destination if the instruction has been input by the emergency button and the automated driving destination has been set, and
   to generate the route of the vehicle along the current travel path of the vehicle and to control the vehicle to travel along the current travel path of the vehicle if the instruction has been input by the emergency button and the automated driving destination has not been set.

3. The driving assistance device according to claim 1, wherein the input switch is provided on a center of a steering wheel.

4. The driving assistance device according to claim 1, wherein the current travel path of the vehicle comprises a route of the vehicle along a current road of the vehicle or a route of the vehicle for automated stopping.

5. A driving assistance method, comprising:
inputting by an input switch an instruction for a vehicle to be in an automated driving operation state;
determining whether or not an automated driving destination has been set;
generating a route of the vehicle to the automated driving destination and controlling the vehicle to travel along the route to the automated driving destination if the instruction for the vehicle to be in the automated driving operation state has been input by the input switch and the automated driving destination has been set, and
generating a route of the vehicle along a current travel path of the vehicle and controlling the vehicle to travel along the current travel path of the vehicle if the instruction for the vehicle to be in the automated driving operation state has been input by the input switch and the automated driving destination has not been set.

6. The driving assistance method according to claim 5, further comprising:
generating the route of the vehicle to the automated driving destination and controlling the vehicle to travel along the route to the automated driving destination if the instruction has been input by an emergency button and the automated driving destination has been set, and
generating the route of the vehicle to the current travel path of the vehicle and controlling the vehicle to travel along the current travel path of the vehicle if the instruction has been input by the emergency button and the automated driving destination has not been set.

7. The driving assistance method according to claim 5, wherein the input switch is provided on a center of a steering wheel.

8. The driving assistance method according to claim 5, wherein the current travel path of the vehicle comprises a route of the vehicle along a current road of the vehicle or a route of the vehicle for automated stopping.

\* \* \* \* \*